US011381600B1

(12) United States Patent
Wang et al.

(10) Patent No.: US 11,381,600 B1
(45) Date of Patent: Jul. 5, 2022

(54) ENCRYPTION TECHNIQUES FOR CONSTRAINING BROWSER COOKIES

(71) Applicant: Google LLC, Mountain View, CA (US)

(72) Inventors: Gang Wang, Jersey City, NJ (US); Wing Pan Leung, Santa Clara, CA (US); Jason Jeffrey Miller, Somerville, MA (US)

(73) Assignee: Google LLC, Mountain View, CA (US)

( * ) Notice: Subject to any disclaimer, the term of this patent is extended or adjusted under 35 U.S.C. 154(b) by 42 days.

(21) Appl. No.: 16/898,565

(22) Filed: Jun. 11, 2020

(51) Int. Cl.
H04L 9/08 (2006.01)
H04L 9/30 (2006.01)
H04L 9/32 (2006.01)
H04L 9/40 (2022.01)
H04L 67/02 (2022.01)
H04L 9/14 (2006.01)
(Continued)

(52) U.S. Cl.
CPC .......... H04L 63/168 (2013.01); H04L 9/0827 (2013.01); H04L 9/30 (2013.01); H04L 9/3247 (2013.01); H04L 63/0807 (2013.01); H04L 63/16 (2013.01); H04L 67/02 (2013.01); G06F 21/602 (2013.01); G06F 21/6263 (2013.01)

(58) Field of Classification Search
CPC ......... H04L 63/168; H04L 67/02; H04L 9/30; H04L 63/0807; H04L 9/3247; G06F 21/602; G06F 21/6263
See application file for complete search history.

(56) References Cited

U.S. PATENT DOCUMENTS 8,239,926 B1* 8/2012 Lin .................... H04W 4/21
726/7
10,897,458 B1* 1/2021 Coral ................ H04L 63/0471
(Continued)

OTHER PUBLICATIONS

"Oblivious Pseudorandom Functions (OPRFs) using Prime-Order Groups" —Davidson et al, Network Working Group, Mar. 2019 https://www.ietf.org/archive/id/draft-irtf-cfrg-voprf-05.html (Year: 2019).*

(Continued)

Primary Examiner — Randy A Scott
(74) Attorney, Agent, or Firm — Fish & Richardson P.C.

(57) ABSTRACT

Methods, systems, and apparatus, including computer programs encoded on computer storage media, for creating secure browser cookies. One of the methods includes providing an encrypted cookie request that requests encryption of a cookie of the digital component provider and includes a digital component request identifier; receiving an encrypted cookie generated by encrypting the cookie using the digital component request identifier and an encryption key, wherein the encrypted cookie is configured for inclusion in a request for digital components from the digital component provider for presentation on the webpage; generating a digital component request for digital components that includes the encrypted cookie and requests identification of a digital component selected for presentation on the webpage using the encrypted cookie; and transmitting the digital component request that includes the encrypted cookie and requests identification of a digital component selected for presentation on the webpage using the encrypted cookie.

20 Claims, 6 Drawing Sheets

(51) Int. Cl.
    *G06F 21/62*     (2013.01)
    *G06F 21/60*     (2013.01)

(56) References Cited

U.S. PATENT DOCUMENTS

2003/0159063 A1*   8/2003   Apfelbaum ........... G06F 21/577
                                                                     726/25
2020/0311309 A1*  10/2020   Dawer .................. H04L 9/0825

OTHER PUBLICATIONS

"Securing HTTP Cookies" Aug. 7, 2017 Camilo Reyes https://blog.jscrambler.com/securing-http-cookies (Year: 2017).*

Davidson et al., "Oblivious Pseudorandom Functions (OPRFs) using Prime-Order Groups" Network Working Group, Mar. 2019, 27 pages.

github.com [online], "Trust Token API" retrieved on Jun. 10, 2020, retrieved from URL <https://github.com/WICG/trust-token-api>, 8 pages.

w3schools.com [online], "iframe" retrieved on Jun. 10, 2020, retrieved from URL <https://www.w3schools.com/tags/tag_iframe.asp>, 7 pages.

Watson, "Web Cryptography APS" Jan. 2017, W3C Recommendation, 113 pages.

\* cited by examiner

ENCRYPTION TECHNIQUES FOR CONSTRAINING BROWSER COOKIES

BACKGROUND

A browser cookie is a small amount of data stored on a user device by a web browser. Browser cookies can be used for many purposes, including storing stateful information, recording browsing activity, and authenticating users. There are several types of cookies, including first-party cookies and third-party cookies. A first-party cookie is a cookie that is created and/or accessed by a domain that a user views directly, i.e., the domain viewable in the address bar of the browser. In contrast, a third-party cookie is a cookie that is created and/or accessed by a different domain than the one viewable in the address bar.

SUMMARY

This specification describes technologies relating to authentication and security techniques for browser cookies.

A web browser on a computer can use cookies when requesting digital components for presentation in a webpage. For example, the web browser can include multiple cookies for different digital component providers. The digital component providers can be web publishers that can provide digital components to the web browser for presentation on a webpage. The digital component providers can also be platforms that provide digital components on behalf of the web publishers. The web browser can determine a cookie for a digital component provider, e.g., stored in a cache, and send the cookie to the digital component provider as part of a request for digital components. The web browser can present the received digital components as part of a webpage.

To increase security, privacy, or both, e.g., without requiring any changes, the web browser can encrypt the cookie before sending the cookie to the digital component provider as part of a request for digital components. The web browser can use a script, received from the digital component provider, to encrypt the cookie. The script can encrypt the cookie using a public key for the digital component provider, a nonce generated by the script, and an encryption algorithm. The nonce can be an identifier for a location on a webpage at which the digital component will be presented. The encryption algorithm can be specified in the script and the script can communicate with an encryption engine that uses the encryption algorithm to encrypt the cookie. The encryption engine can be a component of the web browser.

In general, one aspect of the subject matter described in this specification can be embodied in methods that include the actions of providing, by a computing device and to a component provider process for a digital component provider, an encrypted cookie request that requests encryption of a cookie of the digital component provider and includes a digital component request identifier, the encrypted cookie request for an encrypted cookie configured for inclusion in a request for a digital component for presentation on a webpage; receiving, from the component provider process, an encrypted cookie generated by encrypting the cookie using the digital component request identifier and an encryption key, the encrypted cookie being configured for inclusion in a request for digital components from the digital component provider for presentation on the webpage; generating, by the computing device, a digital component request for digital components that includes the encrypted cookie and requests identification of a digital component selected for presentation on the webpage using the encrypted cookie; and transmitting, to a digital component distribution system, the digital component request that includes the encrypted cookie and requests identification of a digital component selected for presentation on the webpage using the encrypted cookie.

In general, one aspect of the subject matter described in this specification can be embodied in methods that include the actions of receiving, by a component provider process for a digital component provider and from a web browser, a cookie request that includes a digital component request identifier; generating an encrypted cookie by encrypting a cookie for the digital component provider using the digital component request identifier and a public key for the digital component provider; and providing the encrypted cookie to the web browser.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include receiving, by a component provider process for a digital component provider and from a web browser, a cookie request that includes a digital component request identifier; generating an encrypted cookie by encrypting a cookie for the digital component provider using the digital component request identifier and a public key for the digital component provider; and providing the encrypted cookie to the web browser. The method can include receiving, by the component provider process and from the web browser, the cookie for the digital component provider. The method can include sending, by the component provider process and to the web browser, a request for the cookie. Receiving the cookie can be responsive to sending the request for the cookie.

In some implementations, the method can include receiving, from a system for the digital component provider, a script for the component provider process; and creating the component provider process using the script. The script can include a default script for a component provider process. Creating the component provider process can include executing the component provider process on the computing device.

In some implementations, the method can include creating the component provider process for the digital component provider. The method can include creating the digital component request identifier that indicates a location on a webpage for which content will be requested. Transmitting the digital component request can include transmitting, to a digital component distribution system, the digital component request that includes the encrypted cookie and requests identification of a digital component for presentation at the location on the webpage.

In some implementations, the method can include generating, as the digital component request identifier, a nonce. Generating and providing, to the component provider process, the encrypted cookie request can include providing, to the component provider process, the cookie for the digital component provider before receiving the encrypted cookie.

In some implementations, the method can include providing, to each of multiple different component provider processes each for a different digital component provider, a respective encrypted cookie request that requests encryption of a cookie of the respective digital component provider and includes the digital component request identifier; receiving, from one or more of the multiple different component provider processes, an encrypted cookie generated by encrypting the cookie for the respective digital component provider using the digital component request identifier; and transmitting, to the digital component distribution system, the digital component request that includes the encrypted cookies for each of the one or more of the multiple different component provider processes and requests identification of a digital component for presentation on the webpage. Providing, to each of the multiple different component provider processes, the respective encrypted cookie request can include providing, to each of the multiple different component provider processes each for a different digital component provider, the respective encrypted cookie request using cross-document messaging or as a uniform resource identifier parameter. Receiving, from the two or more of the multiple different component provider processes, the encrypted cookie can include receiving, from the two or more of the multiple different component provider processes and using cross-document messaging or as a uniform resource identifier parameter, the encrypted cookie generated by encrypting the cookie for the respective digital component provider using the digital component request identifier.

In some implementations, the method can include providing, to the component provider process, two or more encrypted cookie requests that each request encryption of the cookie of the digital component provider and include a respective digital component request identifier different from digital component request identifiers for the other encrypted cookie requests; receiving, from the component provider process and for each of the two or more encrypted cookie requests, a respective encrypted cookie generated by encrypting the cookie using the respective component request identifier, each of the respective encrypted cookies different from the other encrypted cookies based on the different digital component request identifiers; and transmitting, to the digital component distribution system and for each of the two or more encrypted cookie requests, a respective digital component request that includes the respective encrypted cookie and requests identification of a digital component for presentation on the webpage.

In some implementations, transmitting the digital component request can include providing, to the digital component distribution system, the digital component request that includes a public key for the computing device, a creation time for the digital component request, a payload, an integrity token, a digital signature, and the encrypted cookie. The integrity token can include a verdict that indicates whether the computing device, an application executing on the computing device for which the digital component request was provided, or both, have been validated. Receiving the encrypted cookie can include receiving, by a content tag for the webpage received by a web browser, the encrypted cookie. Generating the digital component request can include providing, by the content tag and to the web browser, a request that includes the digital component request identifier and the encrypted cookie; and generating, by the web browser, the digital component request that includes the public key for the computing device, the creation time for the digital component request, the payload, the integrity token, the digital signature, and the encrypted cookie. Transmitting the digital component request can include transmitting, by the web browser and to the digital component distribution system, the digital component request that includes the public key for the computing device, the creation time for the digital component request, the payload, the integrity token, the digital signature, and the encrypted cookie. The public key for the computing device can be a web browser public key. The method can include generating the digital signature using a private key for the computing device, the digital signature enabling verification of the public key, the creation time, the payload, and the integrity token. The payload can include the digital component request identifier, a uniform resource identifier for the webpage, or both.

In some implementations, the method can include determining, by the computing device, whether a web browser that presents a digital component for the webpage supports third-party cookies. Providing the encrypted cookie request to the component provider process can be responsive to determining that the web browser does not support third-party cookies.

The subject matter described in this specification can be implemented in various embodiments and may result in one or more of the following advantages. In some implementations, the use of encrypted cookies can improve data security, user privacy, or both. In some implementations, systems that use a component provider process can encrypt a cookie for a digital component provider associated with the component provider process. In some implementations, using a digital component request identifier can improve data security by ensuring that a separate identifier is used for each digital component request and encrypted with a cookie for later verification of the cookie and the digital component request identifier that are included in a digital component request.

In some implementations, a digital component request that includes the cookies may be passed through one or more intermediaries. By encrypting the cookies as described in this document, the intermediaries or other parties that may receive the cookie cannot access the cookie or track a user based on the content of the cookie, e.g., based on a cookie identifier of the cookie received in multiple requests, thereby enhancing user privacy while allowing for the exchange of cookie information over a network.

The techniques described in this document allow for the encryption of cookies and generation of self-attestation digital component requests, e.g., in the form of attestation tokens, without modifying the code of the web browser. In this way, the technique can be applied to various different web browsers and without downloading updates to client devices on which the browsers are installed and without encountering compatibility issues across browsers.

The component provider processes that encrypt the cookies can instead use code, e.g., scripts, that are executed by inline frames of webpages. The use of code in this way enables each digital component provider to customize the encryption process for its cookies. The code can be downloaded from a computing system of the digital component provider, e.g., when the inline frame is loaded by the web browser, enabling the digital component provider to update the code without having to propagate the code to each client device after each update, thereby saving processing power and network bandwidth that would be needed to facilitate such code propagation. In some implementations, a web browser can cache the code downloaded from each digital component provider and the public key of each digital component provider. This reduces or eliminates any latency and/or network bandwidth consumption that would otherwise be introduced to the digital component request process by downloading the code and public key at request time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
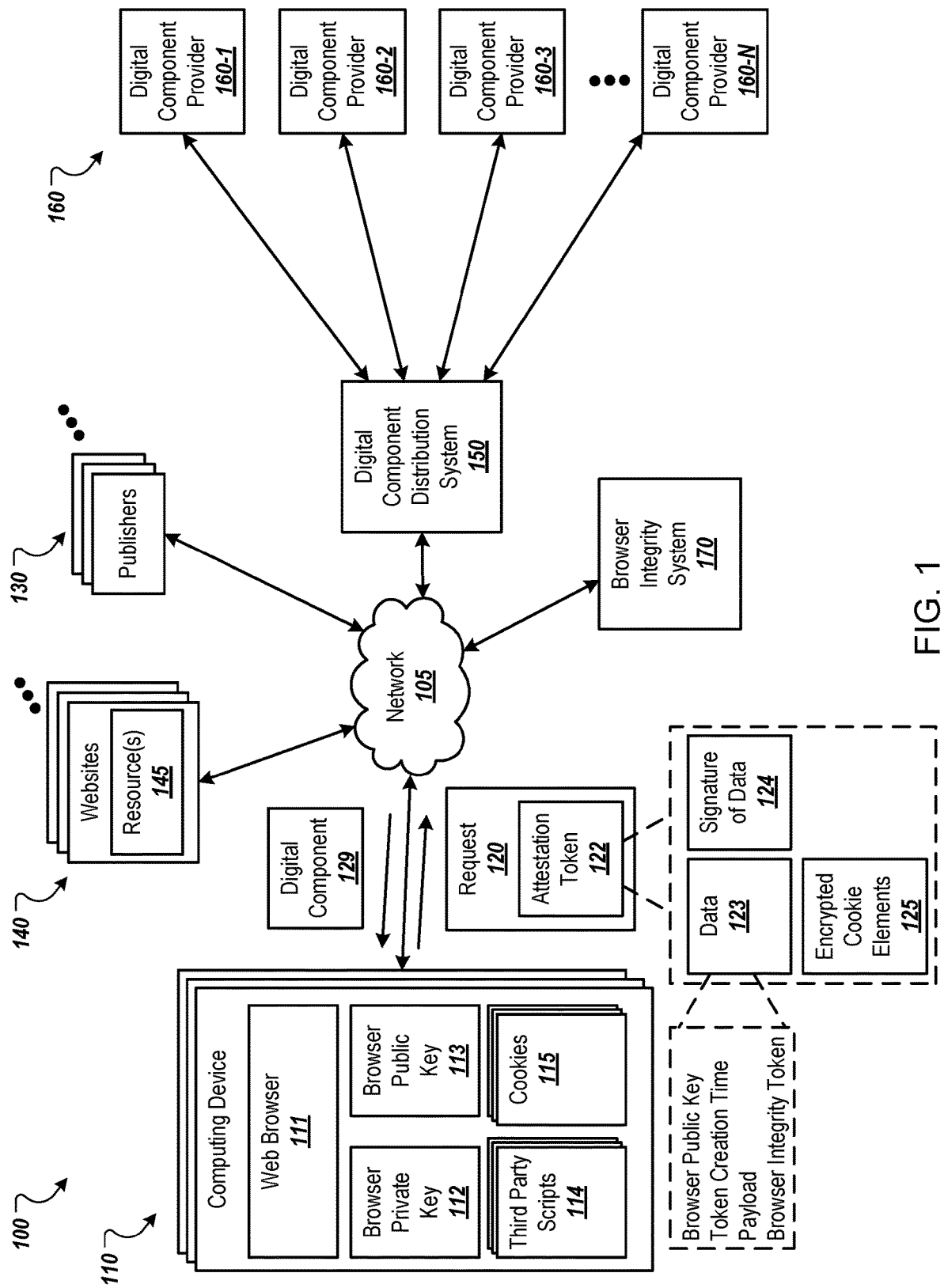
FIG. 1 is a block diagram of an environment in which a digital component system distributes digital components.

FIG. 1 is a block diagram of an environment 100 in which a digital component distribution system 150 distributes digital components 129. The example environment 100 may include many different computing devices 110, publishers 130, and websites 140.

A website 140 is one or more resources 145 associated with a domain name and hosted by one or more servers. An example website is a collection of webpages formatted in HTML that can contain text, images, multimedia content, and programming elements, such as scripts. Each website 140 is maintained by a publisher 130, which is an entity that controls, manages and/or owns the website 140.

A resource 145 is any data that can be provided over a network 105. A resource 145 is identified by a resource address, e.g., a Universal Resource Identifier (URI), that is associated with the resource 145. Resources include HTML pages, word processing documents, and portable document format (PDF) documents, images, video, and feed sources, to name only a few. The resources can include content, such as words, phrases, images, sounds, and videos, that may include embedded information (such as meta-information in hyperlinks) and/or embedded instructions (such as scripts).

A computing device 110, e.g., a client device, is an electronic device that is capable of communicating over the network 105. A computing device 110 typically includes applications, such as a web browser 111 and/or native applications to facilitate the sending and receiving of data over the network 105. A native application is an application developed for a particular platform or a particular device. Publishers 130 can develop and provide the native applications to the computing devices 110. Description below of operations and functions performed by the web browser 111 may be performed by a native application.

The web browser 111 can request a resource 145 from a web server that hosts a website 140 of a publisher 130, e.g., in response to the user of the computing device 110 entering the resource address for the resource 145 in an address bar of the web browser 111 or selecting a link that references the resource address. When the web server provides a resource 145 to the web browser 111, the web server can also provide a cookie 115 of the publisher 130 that the web browser 111 stores on the computing device 110. The cookie 115 is a small amount of data, e.g., a text file, that can be used for many purposes, including storing stateful information, recording browsing activity, and authenticating users. The cookies 115 can include a unique cookie identifier and the small amount of data (which can include a cookie value, attributes, etc.). This cookie 115 is referred to as a first-party cookie as the cookie is created by a website that a user views directly, i.e., the web site for which the domain is viewable in the address bar of the web browser 111.

The web browser 111 can send the publisher's first-party cookie to the web server that hosts the website 140 when the web browser 111 subsequently navigates to the resource 145 and/or while the resource 145 is presented by the web browser 111. The web server can use the data in the cookie 115, for example, to customize content for the user.

In some cases, another web server that hosts another website also stores a cookie 115 on the computing device 110 while the resource 145 is presented in the web browser 111, although that website's domain is not viewable in the address bar of the web browser 111 and the user did not navigate the web browser to that website. This cookie is referred to as a third-party cookie. A third-party cookie can be stored on the computing device 110 when the resource 145 makes a call for content from the other web server.

Some resources 145 include digital component slots for presenting digital components with the resources 145. The digital component slots can be in the form of content tags, which are described in more detail below. As used throughout this document, the phrase "digital component" refers to a discrete unit of digital content or digital information (e.g., a video clip, audio clip, multimedia clip, image, text, or another unit of content). A digital component 129 can be electronically stored in a physical memory device as a single file or in a collection of files, and digital components can take the form of video files, audio files, multimedia files, image files, or text files. For example, the digital component 129 may be content that is intended to supplement content of a webpage or other resource presented by the web browser 111. More specifically, the digital component 129 may include digital content that is relevant to the resource content (e.g., the digital component may relate to the same topic as the webpage content, or to a related topic). The provision of digital components by the digital component distribution system 150 can thus supplement, and generally enhance, the webpage content.

When the web browser 111 loads a resource 145 that includes one or more digital component slots, the web browser 111 can request a digital component 129 for each slot from the digital component distribution system 150. The digital component distribution system 150 can, in turn request digital components from digital component providers 160.

The digital component providers 160 are entities that provide digital components for presentation with resources 145. The digital component providers 160 can include web publishers that generate the digital components for presentation with resources 145. The digital component providers 160 can also include digital component partners that select digital components on behalf of digital component providers 160 in response to digital component requests. For example, some digital component providers 160 can be demand-side platforms and/or supply platforms that select digital components on behalf of web publishers and provide amounts that the web publishers are willing to provide for presentation of the digital components. The digital component providers 160 can provide the digital components and/or amounts in response to requests received from the digital component distribution system 150.

The digital component distribution system 150 can select a digital component for each digital component slot based on various criteria. For example, the digital component distribution system 150 can receive multiple digital components for a digital component slot in a resource 145. The digital component distribution system 150 can select, from the multiple digital components received from the digital component providers 160, a digital component for presentation with the resource 145 based on relatedness to the resource 145, performance of the digital component (e.g., a rate at which users interact with the digital component), etc. The digital component distribution system 150 can then provide the selected digital component(s) to the computing device 110 for presentation with the resource 145.

In some cases, the digital component distribution system 150 and/or the digital component provider 160 for which a digital component is provided can also store a third-party cookie 115 on the computing device 110. The web browser 111 can also provide the third-party cookie 115 to the entity that stored the third-party cookie on the computing device 110. In this way, the entity can use information stored in the third-party cookie 115 to select digital components for presentation at the computing device 110.

The digital component distribution system 150 can transmit digital components 129 to one or more computing devices 110 for presentation by web browsers 111 and/or other applications (e.g., native applications developed for a particular platform) operating on the computing devices 110.

When the web browser 111 sends a request 120 over the network 105, the web browser 111 can generate and send an attestation token 122 with the request, or send a request in the form of an attestation token 122. For example, if the web browser 111 sends a digital component request to the digital component distribution system 150, this request can include an attestation token 122.

The attestation token 122 is used by these entities to validate the integrity of the request. For example, some malicious entities may attempt to falsify the parameters of digital component requests, e.g., to specify different resources with which the digital component will be provided and/or to specify a different user to which the digital component will be presented.

The attestation token 122 includes information and an encryption scheme that provides a secure communication channel between the web browser 111 and the other entities. This prevents others from altering the requests 120, obtaining the cookies of other entities, submitting the same request multiple times (e.g., in the form of a replay attack) and/or ensures that the request 120 came from a validated web browser 111, and/or the web browser is on a trustworthy device.

The attestation token 122 includes a set of data 123 and a digital signature 124, e.g., a digital signature, of the set of data 123. The set of data 123 can include a public key of the web browser 111 sending the request (e.g., public key 113), a token creation time that indicates a time at which the attestation token 122 was created, a payload, and/or a browser integrity token. In some examples, the browser integrity token can be a signed redemption record (SRR).

The web browser 111 can generate and maintain one or more pairs of related cryptographic keys including a private key 112 and a public key 113 that corresponds to, and is mathematically and cryptographically linked to, the private key 112. In some implementations, the keys are provided to the web browser 111 from another application or device. Data that is signed using the private key 112 can only be verified using the corresponding public key 113. Similarly, data that is encrypted using the public key 113 can only be decrypted using the private key 112.

The web browser 111 generates a digital signature 124 of the set of data 123 using a private key 112 for use in validating the integrity of the request 120 by verifying that the set of data 123 was not changed after it was generated by the web browser 111 and for proving that the request originated at the web browser 111. The set of data 123 can include all request parameters that are prone to falsification. In some implementations, the web browser 111 uses an Elliptic Curve Digital Signature Algorithm (ECDSA) to generate the digital signature, but other signature techniques (e.g., RSA) can also be used. The corresponding public key 113 is provided with the attestation token 122 so that entities that receive the attestation token 122 can use the public key 113 to verify the digital signature 124 of the set of data 123.

In some implementations, the public key 113 (and its corresponding private key 112) is an ephemeral key that has a limited life cycle. If the same public key 113 is sent from the same web browser 111 over the course of many requests and/or long periods of time, entities that receive the requests with the public key 113 can track the user of the web browser. For example, the entities can use the public key 113 as an identifier for the user and correlate the payload data of each request to that identifier. Thus, limiting the lifecycle of the public key 113 can limit this tracking ability and therefore protect users' privacy.

The lifecycle of the public key 113 can be configured based on the target level of user privacy. For the most privacy, the lifecycle can be for a single request. That is, the web browser 111 can generate a new public/private key pair for each request 120 sent by the web browser 111. The tradeoff for this level of privacy is the computation cost (e.g., processing power, resource usage, etc.) to generate the public/private key pair. In implementations in which a browser integrity token is generated for each public/private key pair as described below, the computation costs can be even higher and there can be additional latency resulting from communicating with the browser integrity system 170 over the network 105.

In some implementations, the lifecycle of the public key 113 can be for a single page view. In this example, the web browser 111 can generate a new public/private key pair each time the web browser downloads and presents a resource 145. If multiple requests are sent from the same page view while it is presented, each request can include an attestation token 122 that has the same public key 113 and a digital signature verifiable using the same public key 113. This can reduce the computation and latency costs relative to generating a new public/private key pair for each request 120.

In some implementations, the lifecycle of the public key 113 can be for a given publisher domain. In this example, the web browser 111 can generate a respective public/private key pair for each publisher 130 for which the user visits a website 140. This example lifecycle can further reduce the computation and latency costs relative to generating a new public/private key pair for each request 120 and generating a new public/private key pair for each page view.

In some implementations, the web browser 111 can also generate a respective public/private key pair for each digital component provider 160, similar to the way in which the web browser 111 can generate a respective public/private key pair for each publisher 130 for which the user visits a website 140. This effectively provides a browser-managed third-party read-only cookie.

As described above, the token creation time indicates a time at which the attestation token 122 was created. The web browser 111 can record the creation time when the web browser 111 creates the attestation token. This token creation time can be a high resolution timestamp (e.g., accurate to the second, to the millisecond, or to the microsecond). The token creation time can be used to determine whether a request 120 that includes the attestation token 122 is a new or recent request. For example, the entity that receives the attestation token 122 can compare the token creation time to a current time or a time at which the attestation token was received. If the difference between the two times exceeds a threshold, the entity can determine that the request is not new, or invalid, as described in more detail below.

The token creation time can also be used to detect replay attacks. For example, if multiple requests having the same set of data 123, including the same token creation time, public key, or both, are received, the entity that receives the requests can determine that the requests are duplicates and/or that the requests are part of a replay attack.

The token creation time, in combination with other data, can also serve as a transaction identifier for a request 120. For example, the transaction identifier can be a combination of two or more of the token creation time of the attestation token 122, the public key 113 of the attestation token 122, and a recipient's third-party cookie (e.g., one of the encrypted cookies 125 described below). The transaction identifier can be used to deduplicate multiple versions of the same request received from multiple channels. For example, the digital component provider 160-3 can receive the same request from both the digital component distribution system 150 and a digital component partner. In this example, the transaction identifier can be based on the token creation time of the attestation token 122, the public key 113 of the attestation token 122, and the decrypted third-party cookie of the digital component provider 160-3. The digital component provider 160-3 can compare the three pieces of data in two or more requests to determine whether the requests are duplicates, thereby preventing the transmission of duplicated and unnecessary responses.

The payload can include data for the individual request 120. For example, if the request 120 is for a digital component, the payload can include data that can be used to select a digital component. This payload could include the resource 145 that has the digital component slot (or a URI for the resource 145), information about the resource 145 (e.g., topic of the resource), information about the digital component slot (e.g., the number of slots, the type of slots, the size of the slots, etc.), information about the computing device 110 (e.g., type of device, IP address of the device, geographic location of the computing device 110) if the user has enabled this feature, and/or other appropriate information.

The browser integrity token enhances the fraud detection capabilities of the attestation token 122 by enabling the detection of more classes of fraud, such as whether user interactions with websites 140 are genuine. The web browser 111 can include an in-browser integrity component that interacts with the browser integrity system 170, which can be implemented using one or more servers connected to the network 105. The in-browser integrity component can collect fraud detection signals to be analyzed by the browser integrity system 170. The fraud signals can include, for example, mouse movement speed, direction, intermission and other patterns, click patterns, etc. If the browser integrity system 170 concludes that the integrity of the web browser 111 is valid, the browser integrity system 170 can issue a browser integrity token to the web browser 111.

In some implementations, an integrity component in the operating system can collect fraud detection signals at device or browser binary level to be analyzed by the browser integrity system 170. If the browser integrity system 170 concludes that the integrity of the device and/or web browser 111 binary is valid, the browser integrity system 170 can issue a browser integrity token to the web browser 111 via the integrity component in the operating system.

The browser integrity token can include a token creation time that indicates a time at which the browser integrity token was created; the public key 113, or the cryptohash of the public key 113, of the web browser 111 that requested the browser integrity token; the verdict (e.g., whether the browser and/or the device 110 is valid); and/or a digital signature of the rest of the browser integrity token (e.g., the token creation time, the public key 113, and/or the verdict). Using a digital signature of the data including the public key 113, or the cryptohash of the public key 113, binds the browser integrity token to the public key 113.

The digital signature can be generated by a private key owned and securely stored by the browser integrity system 170. The digital signature is publicly verifiable by a public key corresponding to the private key owned and securely stored by the browser integrity system 170. The use of the private and public keys of the browser integrity system to digitally sign the browser integrity tokens and verify these digital signatures in combination with the private and public keys of the web browser 111 to digitally sign the attestation token 122 and verify the signatures of the attestation tokens 122 can provide a secure communication and establish a chain of trust between the entities of FIG. 1.

For example, the digital component distribution system 150 and the digital component providers 160 trust the browser integrity system 170. The digital component distribution system 150 and the digital component providers 160 trust the browser integrity system 170 can verify that the browser integrity token is indeed generated by the browser integrity system 170 and not modified during transmission by verifying the digital signature using a public key that corresponds to the private key used to generate the digital signature and that is securely stored by the browser integrity system 170. Assuming that the browser integrity token indicates that the user, and/or the browser binary, and/or the device, is trustworthy, the digital component distribution system 150 and digital component providers 160 can use the browser public key 113 included in the browser integrity token and attestation token 122 (which are the same) to verify that the attestation token 122 is indeed generated by the web browser 111 that owns the browser public key 113/private key 112 pair and not modified during transmission.

In some implementations, the web browser 111 and the browser integrity system 170 interact to create multiple browser integrity tokens in a batch process. For example, the web browser 111 can send multiple public keys to the browser integrity system 170. The web browser 111 can also collect the fraud detection signals and provide these signals to the browser integrity system 170. The browser integrity system 170 can analyze the fraud detection signals and determine a verdict based on the fraud detection signals. The browser integrity system 170 can then generate a browser integrity token for each public key received from the web browser 111. This batch process can reduce the latency and processing time/resources required to generate the browser integrity tokens relative to generating the browser integrity tokens one at a time as needed by the web browser 111. The web browser 111 can store the browser integrity tokens at the computing device 110 and consume one browser integrity token for each public key 113 based on the lifecycle of the public keys 113 (e.g., per request, per page view, per publisher domain, etc.).

In some implementations, the web browser 111 can redeem a browser integrity token prior to sending a request 120. In response to redeeming the browser integrity token, the web browser 111 can receive a signed redemption record (SRR), which can be in the form of a token. The attestation token 122 can include the SRR in place of the browser integrity token.

In some implementations, the attestation token 122 also includes encrypted cookie elements 125. Each encrypted cookie element 125 can include an encrypted cookie for an entity for which a cookie 115 has been stored on the computing device 110. For example, if the computing device 110 includes a cookie 115 of the digital component distribution system 150 and the request 120 is for a digital component 129, the attestation token 122 can include an encrypted cookie element 125 for the digital component distribution system 150. In another example, if the computing device 110 includes cookies 115 of multiple digital component providers 160 and the request is for the multiple digital component providers 160, the attestation token 122 can include an encrypted cookie element 125 for each of the multiple digital component providers 160. The encrypted cookie elements 125 can be in the form of a string of characters that is parsed by the recipients of the request 120, as described in more detail below.

Entities that store a cookie 115 on the computing device 110 can provide a third party script 114 of the entity to the computing device 110. The web browser 111 can use the third party script 114 of an entity to encrypt the cookie value of the entity's cookie 115 stored on the computing device 110. The entity's third party script 114 can use a public key, e.g., included in the script or otherwise stored in memory accessible by the script, for the entity to encrypt the entity's cookie 115 stored on the computing device 110. The computing device 110 can use the encrypted cookie when communicating with the entity either directly or indirectly.

As described in more detail below, each entity that receives the attestation token 122 can decrypt their encrypted cookie element 115 that is encoded in the request 120 to validate the integrity of the request 120, to obtain a cookie value, or both. For example, a publisher 130 can use its cookie value to customize content of the resource 145 presented by the web browser 111 for presentation by the computing device 110. A digital component provider 160 can use its cookie value to select a digital component to provide to the computing device 110.

By encrypting the cookies 115 using the third party scripts 114, an attestation token 122 and request 120 can securely carry cookies 115 for multiple different entities, e.g., multiple different digital component providers 160. This can prevent entities that are not associated with a cookie, such as hackers, from accessing the cookies of other entities.

In some implementations, to prevent intermediaries from mixing and matching portions of the set of data 123, encrypted cookie elements 125, and/or the digital signatures 124 from different requests, the encrypted cookie elements 125 can be bound to the set of data 123 using a digital component request identifier. The digital component request identifier is specific to a component request and can be used to distinguish the request from other requests, e.g., as a transaction identifier.

Each encrypted cookie element 125 can include a first portion that includes the entity's cookie and a second portion that includes the digital component request identifier or a cryptohash of the digital component request identifier. That is, the encrypted cookie element 125 for an entity can include an encrypted version of a combination of the entity's cookie 115 and the digital component request identifier, whether a cryptohash of the identifier or not. The third party script 114 for the entity can encrypt the combination using the entity's public key.

In some examples, each encrypted cookie element may include a third portion that includes the timestamp when the encrypted cookie element was created. The timestamp may help the entity to identify a stale encrypted cookie element that was generated much earlier than the attestation token to which the encrypted cookie element is attached.

In some implementations, the third party script 114 encrypts the cookie 115 using the digital component request identifier. For instance, the third party script 114 can use the digital component request identifier as an initialization vector to an encryption algorithm. In these implementations, the encrypted cookie element 125 might not include an encrypted version of the digital component request identifier.

When the entity receives an attestation token 122, the entity can attempt to find its cookie in the encrypted cookie elements 125. For example, the entity can decrypt the encrypted cookie elements 125, e.g., one at a time or in parallel, using its private key that corresponds to the public key that the entity's third party script 114 used to encrypt its cookie 115. Some encryption/decryption algorithms have built-in integrity checks, e.g., decrypting some random data or decrypting using the wrong key will fail the integrity check. When the entity uses an encryption/decryption algorithm with built-in integrity checks, if the encrypted cookie element does not belong to the entity, the decryption will fail with probability, e.g., depending on the crypto strength of the built-in integrity checks. If the decryption succeeds, the entity can then determine whether the decrypted cookie element includes a cookie identifier of a cookie that the entity stored on a computing device, e.g., when the entity stores cookies on multiple computing devices, with each one having a unique cookie identifier.

When the entity determines that the decryption fails, or the decrypted cookie element does not include a cookie identifier for the entity, the entity can determine to skip further analysis of the decrypted cookie. When the entity determines that the decryption succeeds and/or that the decrypted cookie element matches a cookie identifier for the entity, the entity can determine to perform further processing of the cookie. The further processing can include determining content for the computing device 110 using the decrypted cookie element. If none of the encrypted cookie elements 125 belong to the entity, the entity can determine that the entity did not store a cookie on the computing device 110 from which the request 120 was sent or the request 120 was falsified.

In some implementations, the entity can determine whether a portion of the decrypted cookie element matches the digital signature 124. For instance, the entity can determine whether the digital component request identifier, or the cryptohash of it, included in the decrypted cookie element matches the digital component request identifier included in the attestation token protected by the digital signature 124. If the two match, the entity can determine that the decrypted cookie element is its cookie, is associated with the request, and the request is valid. If one of the portions does not match, e.g., the two do not match, the entity can determine that the encrypted cookie element 125 does not belong to the request, and some malicious party has likely mixed-and-matched requests and encrypted cookie elements.

In some implementations, to make it easier for an entity to find its encrypted cookie element 125 in the attestation token 122, the web browser 111 could be configured to include, in the attestation token 122, a list of the domains for which an encrypted cookie element 125 is included in the attestation token 122 or a list that maps the encrypted cookie elements 125 to their domains.

The computing device 110 may include personal computers, mobile communication devices, e.g., smart phones, and other devices that can send and receive data over the network 105. The network 105, such as a local area network (LAN), a wide area network (WAN), the Internet, a mobile network, or a combination thereof. The network 105 connects computing devices 110, publishers 130, websites 140, the digital component distribution system 150, and a browser integrity system 170.

Figure 2:
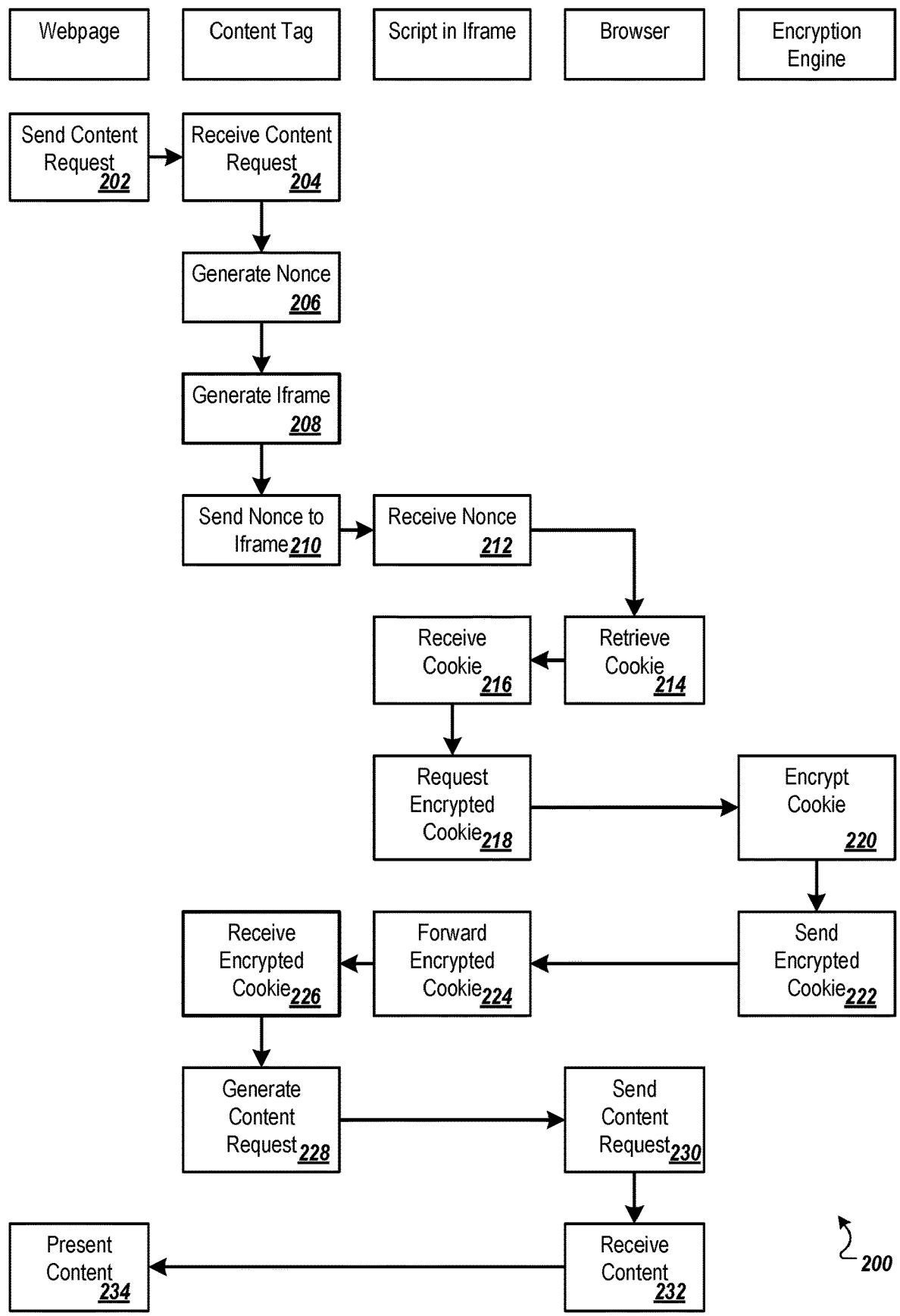
FIG. 2 is a flow diagram of a process for encrypting a cookie.

FIG. 2 is a flow diagram of a process 200 for encrypting a cookie. For example, the process 200 can be used by the computing device 110 from the environment 100.

A webpage sends a content request (202). For instance, the webpage can determine that one or more content tags for the webpage should request content. The webpage can be for presentation on a web browser executing on a computing device.

A content tag receives the content request (204). In some examples, the content tag receives the request from the webpage. The content tag can determine a type of content the content tag should request, a location for the content, e.g., on the webpage, or other appropriate parameters for the content.

The content tag generates a nonce (206). The content tag can generate, instead of or as the nonce, a digital component request identifier. The digital component request identifier can be for the content that will be requested. The digital component request identifier can be specific to the content request, e.g., such that requests for different content have different unique digital component request identifiers. In some examples, the digital component request identifier indicates a location on a webpage for which content will be requested.

The content tag generates an inline frame (iframe) (208). For example, the content tag, the web browser, or another process executing on the computing device can receive, from a system for the digital component provider, computer-readable code, e.g., a script, for the component provider process. The script can be requested from a computing system of the digital component provider when the iframe is created or prior to the iframe being created. For example, the web browser can request the script from the digital component provider when generating content for presentation of a corresponding webpage. After the web browser downloads the script from a digital component provider, the web browser can store the script at the computing device, e.g., in a cache of the computing device to reduce latency in obtaining the script when the iframe is created. The script can be any appropriate type of script.

The content tag can use the script to create a component provider process, e.g., an iframe, for the digital component provider. The content tag can cause the execution of the component provider process on the computing device that is executing the web browser. In another example, the webpage can include iframe code that causes the web browser to generate the iframe. The iframe code can also include code that causes the web browser to download the script from the digital component provider.

In some examples, the script can be a default script for a component provider process. For instance, a digital component distribution system or another system can generate scripts for use by digital component providers. The system can provide the default script to multiple different digital component providers, each of which use the same script but different public keys, and optionally different encryption processes, to create encrypted cookies.

In some implementations, when the content tag requests encrypted cookies for multiple different digital component providers, the content tag can generate an iframe for each of the multiple different digital component providers. The content tag can use respective scripts for the digital component provider to generate a respective iframe.

The content tag sends the nonce to the iframe (210). The content tag can send the digital component request identifier to the iframe. The content tag can send the data to the iframe using cross-document messaging or as a uniform resource identifier parameter. The content tag can provide an encrypted cookie request that requests encryption of a cookie of the digital component provider and includes a digital component request identifier. The encrypted cookie request can be for an encrypted cookie configured for inclusion in a request for digital content for presentation on a webpage. In some examples, the encrypted cookie request can include the nonce or digital component request identifier that the iframe or another type of component provider process will encrypt.

The script in the iframe receives the nonce (212). The iframe can be, or implement, a component provider process. The iframe can receive the digital component request identifier. The iframe can validate the origin of the message that includes the nonce.

For example, the iframe can validate that the message came from a given origin, e.g., the script, by checking a value for the message that includes the nonce. For instance, the message can include an "Event.origin value", a "targetOrigin" value, or both. In some implementations, the value can be an unspoofable string set by a User Agent and can be relied on for security purposes. In some examples, messages sent with a targetOrigin value that does not match the eventual recipient of the message event will be silently terminated. The iframe, the host page, or both can specify a target origin for which a message is intended using a "targetOrigin" value.

The component provider process can receive a cookie request that includes a digital component request identifier, e.g., the nonce, from the web browser, from the content tag, or from another appropriate process executing on the computing device.

The browser retrieves a cookie (214). For example, the web browser can retrieve the cookie upon the request of the script in the iframe. The web browser can retrieve the cookie in response to receipt of a request, from the component provider process, for the cookie. The browser can retrieve the cookie from local storage of the computing device.

The script in the iframe receives the cookie (216). For instance, the digital component provider process receives the cookie from the web browser. The cookie is specific to a digital component provider for the component provider process. For example, each of multiple, different digital component providers can store a different cookie on the computing device, e.g., as a resource for the web browser and as permitted based on settings for the computing device, for the web browser, or both.

The cookie is accessible to the component provider process. For instance, the cookie is not marked as "HTTP-only" which could prevent a script in an iframe from accessing the cookie.

The script in the iframe requests an encrypted cookie (218). For instance, the digital component provider process can communicate with an encryption engine, e.g., a Web Cryptography application programming interface (API), to encrypt the cookie. The digital component provider process can send the request to the encryption engine to cause the encryption engine to encrypt the cookie. The request can include the digital component request identifier, a public key for the digital component provider, or both.

An encryption engine encrypts the cookie (220). The encryption engine can encrypt the cookie using the digital component request identifier, the public key, or both. For instance, the encryption engine can encrypt both the cookie and the digital component request identifier using an encryption technique and the public key. In some examples, the encryption engine can use the digital component request identifier as an initialization vector for an encryption technique. The encryption engine can initialize the encryption technique using the digital component request identifier and then encrypt the cookie using the initialized encryption algorithm and the public key. By encrypting the cookie using the digital component request identifier, the cookie is bound to the current request.

The encryption engine can use any appropriate encryption algorithm to encrypt the cookie. For instance, the encryption engine can use a default encryption algorithm. In examples when the request for an encrypted cookie identifies an encryption algorithm, e.g., based on data for the script, the encryption engine can use the identified encryption algorithm to encrypt the cookie. For example, each digital component provider can specify a custom encryption algorithm that uses the digital component request identifier to encrypt its cookie.

The component provider process can generate an encrypted cookie by encrypting the cookie for the digital component provider using the encryption engine, the digital component request identifier, and a public key for the content provider. In some examples, the component provider process causes the encryption engine to generate the encrypted cookie by sending a request for an encrypted cookie to the encryption engine.

The encryption engine sends the encrypted cookie (222). For instance, the encryption engine sends the encrypted cookie to the component provider process after encrypting the cookie.

The script in the iframe receives the encrypted cookie and forwards the encrypted cookie to the content tag (224). For example, the component provider process receives the encrypted cookie from the encryption engine. The component provider process can receive the encrypted cookie using an application programming interface for the encryption engine. The component provider process can provide the encrypted cookie to the web browser, e.g., the content tag.

The content tag receives the encrypted cookie (226). The content tag can receive the encrypted cookie from the component provider process using cross-document messaging or as a uniform resource identifier parameter. The content tag, the web browser, or another process on the computing device can use the encrypted cookie to request digital components from the digital component provider for presentation with the webpage. For instance, when the content tag is for a native application other than a web browser, the native application can use the encrypted cookie to request content for presentation in the native application. In these examples, the iframe would receive the cookie from the native application.

The content tag generates a content request (228). The request can include the digital component request identifier and the encrypted cookie. The content tag can call a fetch application programming interface call of the web browser to cause the web browser forward the content request to another system. The content tag can call the fetch application programming interface call to cause the web browser to add authentication data to the request, e.g., to generate an attestation token.

In some implementations, when the content tag generates multiple component provider processes, each for a different digital component provider, the content tag or another part of the web browser, can receive an encrypted cookie from each of the component provider processes. The content tag can insert all of the encrypted cookies, and the digital component request identifier, into the content request, e.g., into a headers object for the content request.

In some examples, the content tag can include data in the content request that indicates a subset of headers, e.g., HTTP headers, over which the web browser should sign. The web browser can use this data when generating a digital signature. The digital signature can be used by downstream processes to verify data in a content request, e.g., to prevent another system from generating false content requests, to verify that data in a content request has not been modified, or both. For instance, the web browser can use the data when generating an attestation token and a signature for the attestation token, e.g., the attestation token signature can be for at least the subset of headers.

The browser sends the content request (230). For example, the web browser generates an attestation token for the content request and sends the content request, with the attestation token, to a digital component distribution system. The content request includes one or more encrypted cookie elements and requests identification of a digital component for presentation with the webpage. The content request can include the digital component request identifier. The content request can include one or both of the encrypted cookie or the digital component request identifier in a header.

The attestation token, or another part of the content request, can include one or more of a public key for the computing device, a creation time for the digital component request, a payload, an integrity token, or a digital signature. The public key can be a web browser public key for the web browser, e.g., one of the ephemeral public keys described above.

The attestation token can include a payload. The payload can include the digital component request identifier, a uniform resource identifier for the webpage, or both. The payload can also include data indicating the number of digital component slots on the webpage, the locations of the slots, the types of slots, and/or other information useful for selecting a digital component for presentation with the webpage.

The web browser can generate, for the attestation token, a digital signature, as discussed in more detail above. For example, the web browser can generate the signature using a private key for the computing device. The signature can enable verification of the public key, the creation time, the payload, and the integrity token by a downstream device.

The web browser can send the content request to a digital component distribution system. The digital component distribution system can extract the encrypted cookies from the content request, e.g., from one or more headers in the content request. The digital component distribution system can validate the request, as discussed in more detail below. When the request is valid, the digital component distribution system can pass the encrypted cookies to one or more downstream systems, e.g., one or more digital component providers.

The digital component providers can receive the encrypted cookies and decrypt the encrypted cookie that is specific to the digital component provider, as discussed in more detail below. At least some of the digital component providers can provide content to the web browser, e.g., via the digital component distribution system, in response to receipt of their encrypted cookie. For example, the digital component providers can provide digital components and/or amounts to the digital component distribution system. The digital component distribution system can select one or more of the digital components and provide the selected digital component(s) to the web browser.

The browser receives content (232). For instance, the web browser receives content from some of the digital component providers. The browser can make the content available to the webpage or otherwise available for presentation with the webpage. For example, the browser can provide the content to the webpage, send a message to the webpage that indicates that the content is available for presentation in the webpage, or perform another appropriate process.

The webpage presents the content (234). For example, the webpage retrieves the content from memory and presents the content, e.g., on a display for the computing device. The display can be integrated into the computing device, e.g., when the computing device is a smart phone, or separate from the computing device.

The order of steps in the process 200 described above is illustrative only, and encrypting the cookie can be performed in different orders. For example, the content tag can generate the iframe and then generate the nonce or generate both substantially concurrently.

In some implementations, the process 200 can include additional steps, fewer steps, or some of the steps can be divided into multiple steps. For example, the web browser can cache one or more scripts for respective digital component providers in memory. This can enable the web browser to use a script for a digital component provider multiple times and determine to skip requesting the script from a system for the digital component provider once the script is cached. In some examples, the web browser can cache a public key for the digital component provider along with the respective script.

In some implementations, the content tag can send a single request to a digital component process for multiple content locations on the webpage. For example, when a webpage includes multiple locations for digital content, each of which can present different content, the content tag can send a single request to the digital component process for an encrypted cookie. The content tag can then use the encrypted cookie to generate a single content request, e.g., in step 228, or in multiple content requests. For instance, the content request can indicate a quantity of digital content that the computing device is requesting from a digital component provider. The computing device, e.g., the web browser, can receive all of the requested digital content from the digital component distribution system or from a single digital component provider, or receive the requested digital content from a combination of multiple different digital component providers.

In some implementations, the computing device can perform one or more steps in the process 200 for different digital component providers. For instance, the computing device can perform steps 208 through 226 for each of the different digital component providers. Specifically, the computing device can provide, to each of multiple different component provider processes each for a different digital component provider, a respective encrypted cookie request that includes a cookie of the respective digital component provider and the digital component request identifier. The computing device can receive, from two or more of the multiple different component provider processes, an encrypted cookie generated by encrypting the cookie for the respective digital component provider using the digital component request identifier. The computing device can then perform step 228 once, e.g., the computing device can provide, to a digital component distribution system, the digital component request that includes the encrypted cookies for each of the two or more of the multiple different component provider processes and requests identification of a digital component for presentation on the webpage.

In some implementations, the computing device performs some steps of the process 200 multiple times for a single digital component provider. For instance, the computing device can perform steps 206 and 210 through 224 for each of multiple different digital content requests. Because the computing device performs steps 206 multiple times, each of the requests is associated with a different digital component request identifier, e.g., a different nonce. The computing device can provide, to the component provider processes, two or more encrypted cookie requests that each include the cookie of the digital component provider and a respective digital component request identifier different from the digital component request identifiers for the other encrypted cookie requests. The computing device can receive, from the component provider processes and for each of the two or more encrypted cookie requests, a respective encrypted cookie generated by encrypting the cookie using the respective component request identifier, each of the respective encrypted cookies different from the other encrypted cookies based on the different digital component request identifiers. The computing device can provide, to the digital component distribution system and for each of the two or more encrypted cookie requests, a respective digital component request that includes the respective encrypted cookie and requests identification of a digital component for presentation on the webpage. In some examples, the computing device can provide a first digital component request to a first digital component distribution system and a second digital component request to a second, different digital component distribution system.

In some implementations, the computing device can determine a messaging format supported by the web browser. For instance, the content tag or another process on the computing device can determine whether the web browser supports an alternative messaging format, e.g., when the web browser supports use of third-party cookies. Upon determining that the web browser supports an alternative messaging format, the computing device can use the alternative messaging format, e.g., that supports use of third-party cookies. Upon determining that the web browser does not support an alternative messaging format, the computing device can generate the digital component request identifier, create the component provider process, provide the encrypted cookie request to the component provider process, or perform a combination of two or more of these.

Figure 3:
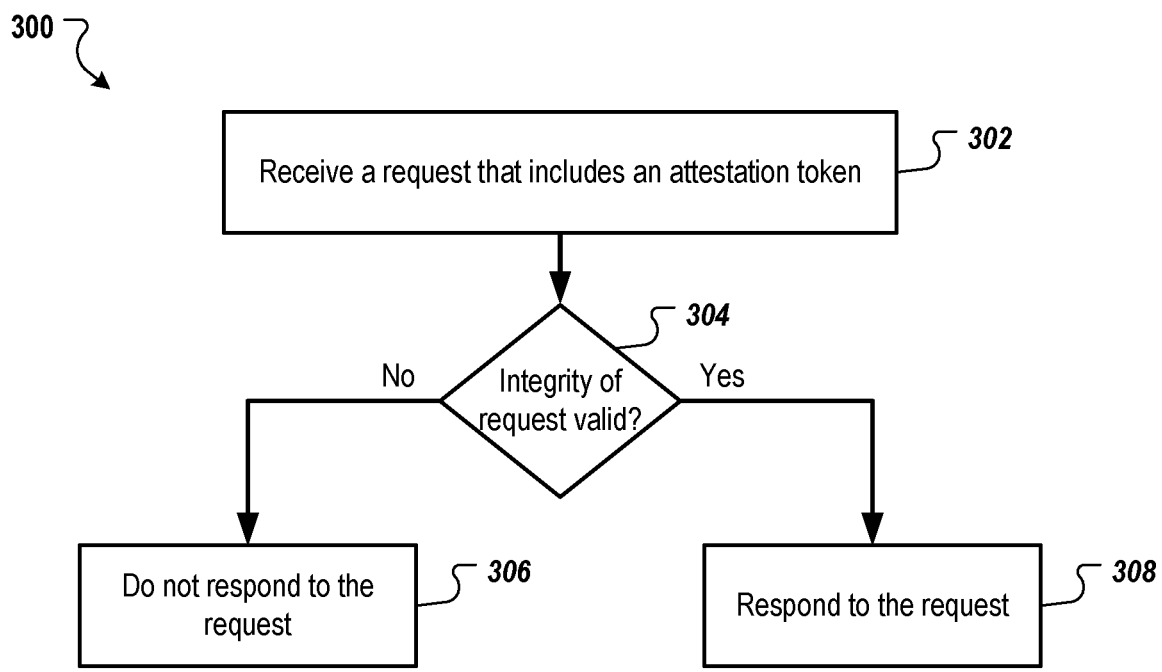
FIG. 3 is a flow diagram that illustrates an example process for validating the integrity of a request and responding to the request.

FIG. 3 is a flow diagram that illustrates an example process 300 for validating the integrity of a request and responding to the request. The process 300 can be implemented, for example, by a recipient of the request, such as a publisher 130, a digital component distribution system 150, or a digital component provider 160 of FIG. 1. Operations of the process 300 can also be implemented as instructions stored on non-transitory computer readable media, and execution of the instructions by one or more data processing apparatus can cause the one or more data processing apparatus to perform the operations of the process 300.

A request that includes an attestation token is received (302). A web browser of a computing device can send a request in response to a user interaction with the web browser. For example, if the user navigates to a website to view a resource, the web browser can send a request to the website. In another example, if the resource includes a digital component slot, the web browser can send, to a digital component distribution system, a request for a digital component.

As described above, the request can include an attestation token that includes a set of data, a digital signature of the set of data, and optionally encrypted cookie elements for one or more recipients, e.g., each of one or more digital component providers. The set of data can include a public key of the web browser that sent the request (e.g., a per-domain ephemeral public key), a token creation time that indicates the time at which the attestation token was created by the web browser, a payload, and/or a browser integrity token. The web browser can generate the digital signature of the set of data using the browser's public key.

The web browser can generate an encrypted cookie element for one or more recipients of the request. For a given recipient, the web browser can generate the encrypted cookie element by encrypting the recipient's cookie stored on the computing device using a public key of the recipient, e.g., as discussed above with reference to FIG. 2.

A determination is made whether the integrity of the request is valid (304). The integrity of the request can be invalid if any data in the set of data changed between the time at which the attestation token was created and the time at which the request was received, a duration of time between the token creation time and the time at which the request was received exceeds a threshold, the browser integrity token is invalid, or the attestation token does not include an encrypted cookie of the recipient. An example process for determining whether the integrity of a request is valid is illustrated in FIG. 4 and described below.

If a determination is made that the integrity of the request is invalid, a response to the request is not provided (306). That is, the recipient may ignore the request. For example, the recipient that determines that the request is invalid may not provide a digital component. A digital component provider may determine that the request is not valid because the provider's cookie is not included in an encrypted cookie element in the attestation token. However, another digital component provider may determine that the request is valid because the provider's cookie is included in an encrypted cookie element of the attestation token.

If a determination is made that the integrity of the request is valid, a response is provided to the request (308). For example, if the request is for a resource, the website may provide the resource in response to the request. The recipient that determines that the request is valid may provide a digital component in response to the request.

Figure 4:
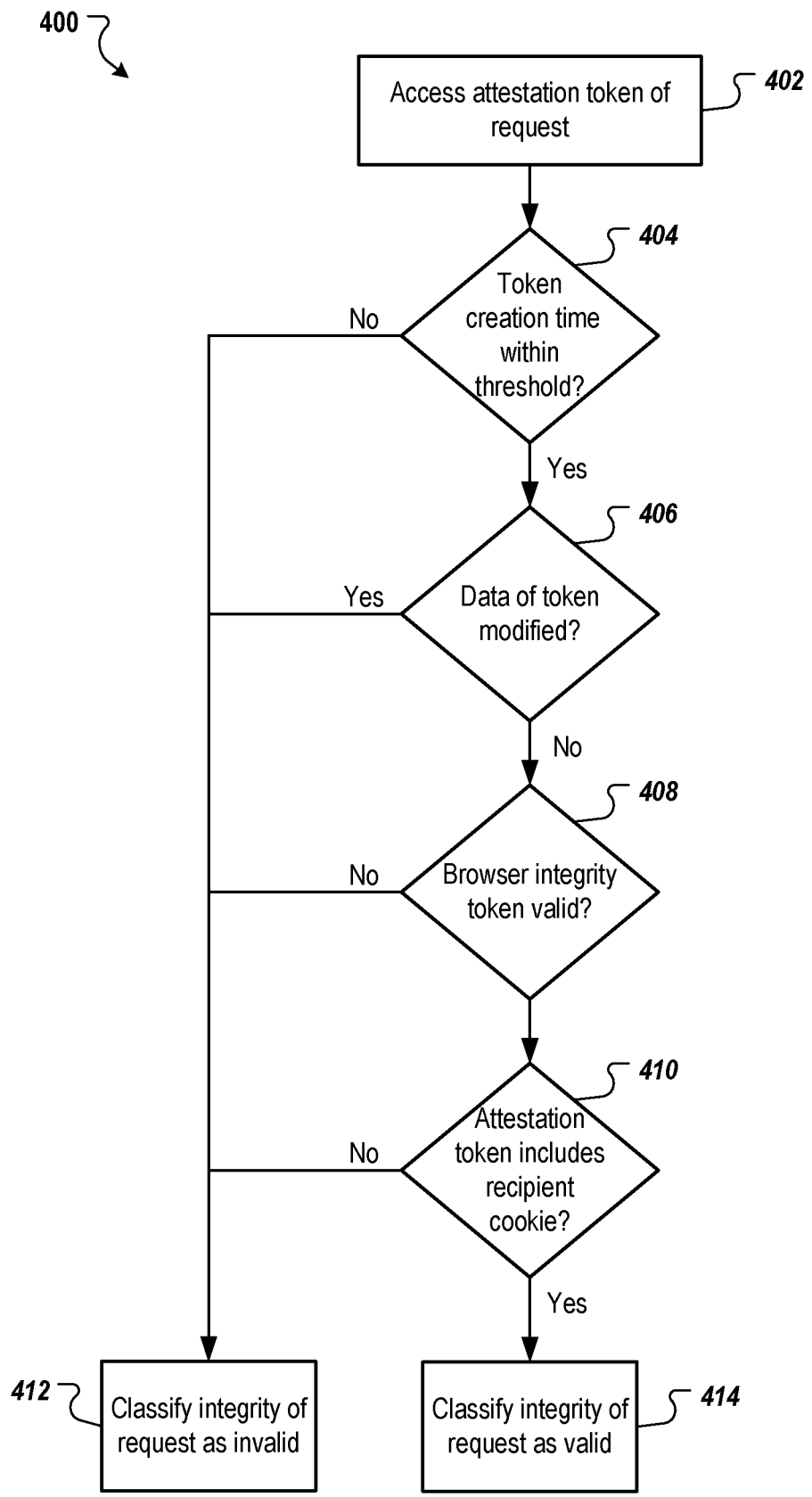
FIG. 4 is a flow diagram that illustrates an example process for determining whether the integrity of a request is valid using an attestation token.

FIG. 4 is a flow diagram that illustrates an example process 400 for determining whether the integrity of a request is valid using an attestation token. The process 400 can be implemented, for example, by a recipient of the request, such as a publisher 130, a digital component distribution system 150, or a digital component provider 160 of FIG. 1. Operations of the process 400 can also be implemented as instructions stored on non-transitory computer readable media, and execution of the instructions by one or more data processing apparatus can cause the one or more data processing apparatus to perform the operations of the process 400.

An attestation token is accessed (402). The attestation token can be included with a request received from a web browser. As described above, the attestation token includes a set of data, a digital signature of the set of data, and optionally encrypted cookie elements for one or more recipients. The set of data can include a public key of the web browser that sent the request, a token creation time that indicates the time at which the attestation token was created by the web browser, a payload, and/or a browser integrity token.

A determination is made whether the token creation time is within a threshold time duration of a time at which the request was received or within a threshold time duration of a current time (404). For example, a determination can be made of the difference between the time at which the request was received (or the current time) and the token creation time. If the difference satisfies the threshold time duration, e.g., is less than or equal to the threshold duration time, the token creation time is within the threshold time duration. If the token creation time is not within the threshold time duration, e.g., meaning that the request is old, the integrity of the request can be classified at invalid (412).

If the token creation time is within the threshold time duration, e.g., meaning that the request is new or recent, a determination is made whether data in the set of data of the attestation token has been modified after the digital signature of the attestation token was generated (406). For example, the public key of the browser that is included in the attestation token can be used to verify the digital signature of the attestation token. If the signature cannot be verified using the public key, a determination is made that the data in the set of data has been modified. For example, such data may have been modified by an entity that intercepted the request or an intermediary. If the digital signature is verified using the public key, a determination is made that the data in the set of data of the attestation token has not been modified.

If a determination is made that the data in the set of data has been modified, the integrity of the request is classified as being invalid (412). If a determination is made that the data in the set of data of the attestation token has not been modified, a determination is made whether the browser integrity token is valid (408). This determination can include determining whether the verdict of the browser integrity token is valid and determining whether the public key of the browser integrity token matches the public key of the attestation token. If the verdict is invalid or the public keys do not match or both, a determination is made that the browser integrity token is invalid and the integrity of the request is classified as invalid (412). If the verdict is valid and the public keys match, a determination can be made that the browser integrity token is valid.

In some implementation, the browser integrity token doesn't contain the verdict information. Instead, the presence of the browser integrity token can be an indication that the browser is trustworthy, or the browser's integrity is valid. The absence of the browser integrity token can indicate that the browser is untrustworthy, or the browser's integrity is invalid.

This determination can also include verifying the digital signature of the browser integrity token. As described above, the browser integrity system can digitally sign the data of the browser integrity token using a private key of the browser integrity system. The browser integrity system can provide a public key that corresponds to this private key to recipients that may receive device integrity tokens generated by the browser integrity system. Each recipient of the request can use this public key to verify the signature of the browser integrity token which, if successful, indicates that the data of the browser integrity token has not been modified since it was created. In this example, if the verdict is valid, the public keys match, and the digital signature of the browser integrity token is verified successfully, a determination can be made that the browser integrity token is valid.

If a determination is made that the browser integrity token is valid, a determination is made whether the attestation token includes the recipient's cookie (410). As described above, the attestation token can include, for each of one or more of the recipients of the request, an encrypted cookie element. The encrypted cookie element can include an encrypted version of the recipient's cookie that has been encrypted using a public key of the recipient, as described in more detail below.

If the attestation token includes the recipient's cookie, the integrity of the request can be classified as valid (414). If not, the integrity of the request can be classified as invalid (412) or the recipient can determine that the recipient has not stored a cookie at the client device from which the request was sent.

In some implementations, the operation 410 can be excluded or skipped. In such an implementation, the request can be classified as valid if all of operations 404 through 408 are passed. The order of the operations 404 through 410 can be changed. For instance, a recipient can perform step 406 before performing step 404, etc.

Figure 5:
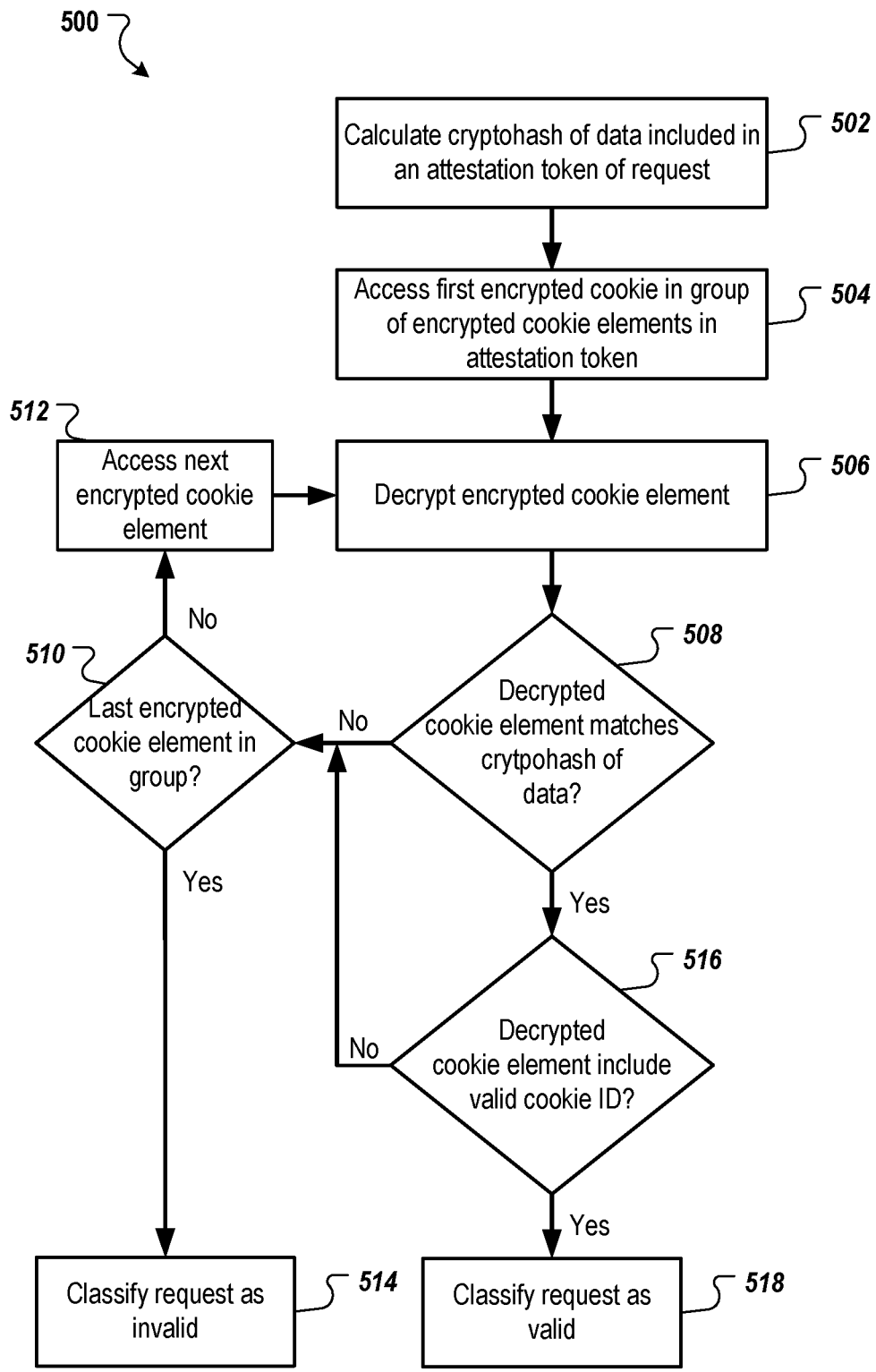
FIG. 5 illustrates a process for determining the integrity of requests that include encrypted cookie elements for entities.

FIG. 5 illustrates a process 500 for determining the integrity of requests that include encrypted cookie elements for entities. If the encrypted cookie element for a recipient only contains the recipient's cookie, the encryption result is stable. Intermediaries or others that may gain access to the requests can rely on the encrypted cookie element as a stable identifier to track a user. To prevent such tracking, randomness can be introduced to the encryption process, e.g., using the process 400, such that the encryption element for a given recipient and a given computing device is specific to each request.

In some implementations, the encryption algorithm can be probabilistic, e.g., multiple invocations of the same encryption algorithm with exactly the same encryption key and plaintext can be guaranteed to produce different output, all of which can be decrypted to the same original plaintext with the corresponding decryption key.

To cryptographically bind one or more encrypted cookies to an attestation token, a computing device can generate an outgoing request that includes the encrypted cookies in the header of the outgoing request. The computing device can then generate a signature for the request that cryptographically binds the encrypted cookies to the request to prevent falsification. A recipient system can then use the signature to verify that its encrypted cookie, if any, is associated with the request.

The process 500 can be implemented, for example, by a recipient of the request, such as a publisher 130, a digital component distribution system 150, or a digital component provider 160 of FIG. 1. Operations of the process 500 can also be implemented as instructions stored on non-transitory computer readable media, and execution of the instructions by one or more data processing apparatus can cause the one or more data processing apparatus to perform the operations of the process 500.

In this example process 500, a request includes an attestation token that has a group of encrypted cookie elements, e.g., one for each of multiple recipients. The encrypted cookie element for each recipient is an encrypted version of the recipient's cookie using a digital component request identifier as an encryption initialization vector, or as the first portion of the encrypted cookie element. The web browser that sends the request, e.g., a component provider process, can use a given recipient's public key to encrypt the recipient's cookie using the digital component request identifier as an encryption initialization vector. The use of the encryption initialization vector, or as the first portion of the encrypted cookie element, introduces the randomness that makes the encrypted cookie element specific to each request.

A cryptohash of a data included in an attestation token of a request is calculated (502). The cryptohash can be of a nonce, or digital component request identifier included in the attestation token. The cryptohash of nonce or the digital component request identifier, or both, can be calculated using a cryptohash algorithm adopted by the browser.

A first encrypted cookie element in the group of encrypted cookie elements is accessed (504). In this example, each encrypted cookie element is accessed one by one. In other implementations, multiple cookie elements can be accessed and processed in parallel, e.g., using multiple threads or multiple processors.

The encrypted cookie element is decrypted (506). The encrypted cookie element can be decrypted using the recipient's private key that corresponds to the recipient's public key used to encrypt its cookie and the digital component request identifier in the attestation token as the encryption initialization vector, or as the first portion of the encrypted cookie element. The encrypted cookie element can be decrypted using a process that corresponds with the encryption algorithm used by the encryption engine.

A determination is made whether the decryption was successful, whether decrypted cookie element includes a portion that matches the cryptohash of the data calculated in operation 502, or both (508). The crypothash of the data can be a cryptohash of the nonce calculated in operation 502. For example, the cryptohash of the data can be compared to the decrypted cookie element to determine whether there is a match between the cryptohash and a portion of the decrypted cookie element.

If there is no match, a determination is made whether the currently accessed encrypted cookie element is the last encrypted cookie element included in the group (510). If the currently accessed cookie element is not the last encrypted cookie element in the group, the next encrypted cookie element is accessed (512). Operations 506 and 508 are then performed on this cookie element.

For each decrypted cookie element that includes a portion that matches the cryptohash of the data, a determination is made whether the decrypted cookie element includes a portion that matches a cookie identifier of the recipient (516). For example, the recipient may be a publisher or digital component provider that has stored a cookie on multiple client devices. Each of the cookies can have a unique cookie identifier that is stored by the publisher or digital component provider. Thus, the recipient can compare its cookie identifiers to the decrypted cookie element to determine whether the decrypted cookie element includes a valid cookie identifier of the recipient. If not, the process 500 returns to operation 510 until a match is found at operation 516 or all encrypted cookie elements in the group are accessed and processed.

If a decrypted cookie element includes a portion that matches a valid cookie identifier of the recipient (and a portion that matches the cryptohash of the data in operation 508), the request is classified as valid (518). If none of the decrypted cookie elements includes both matching portions, the request is classified as invalid (514), or the recipient can determine that it has not stored a cookie on the client device from which the request was sent.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 6:
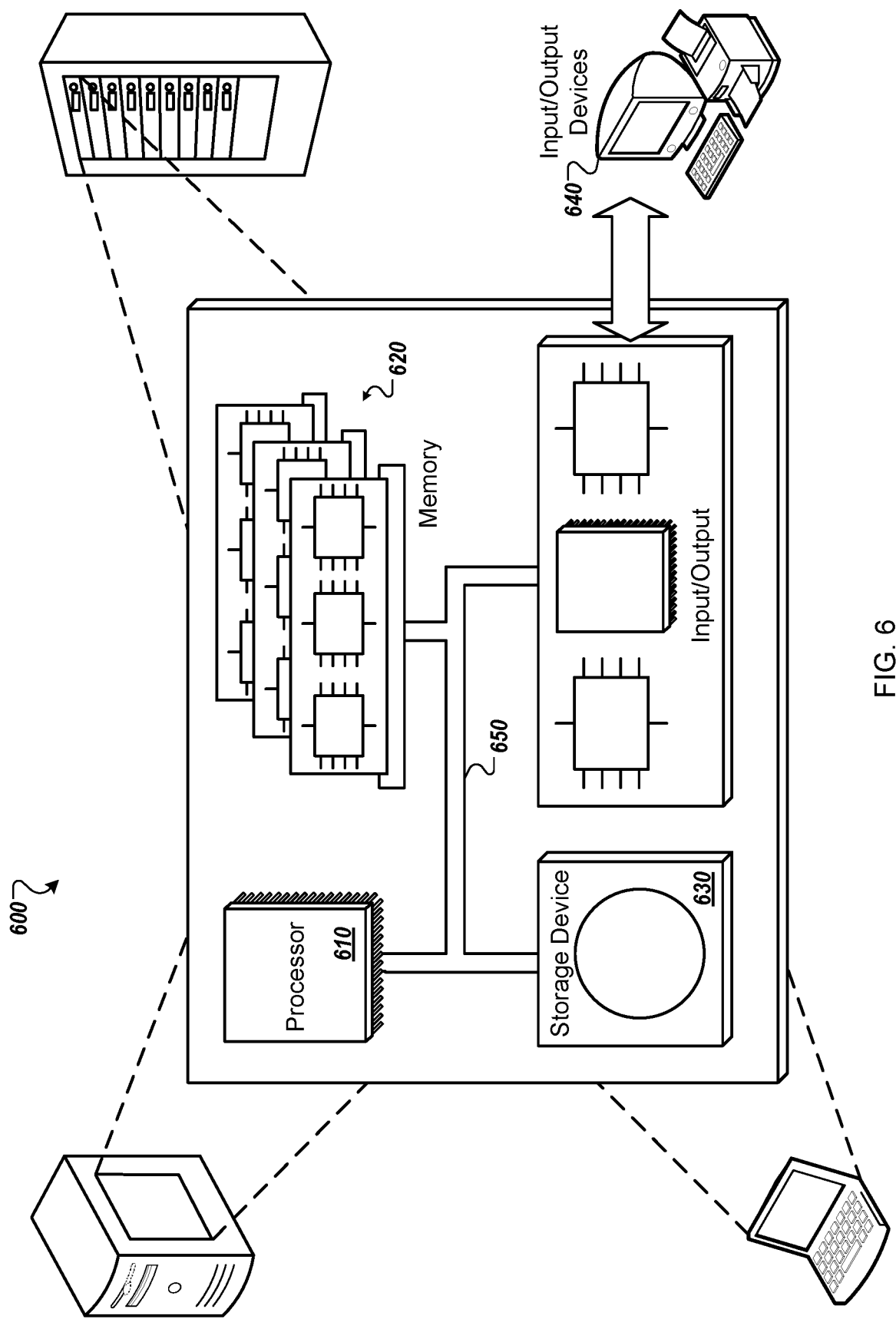
FIG. 6 is a block diagram of a computing system that can be used in connection with computer-implemented methods described in this document.

An example of one such type of computer is shown in FIG. 6, which shows a schematic diagram of a computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
providing, by a computing device and to a component provider process for a digital component provider, an encrypted cookie request that (i) requests encryption of a cookie of the digital component provider and (ii) includes a digital component request identifier for a digital component request with which an encrypted cookie will be sent, the encrypted cookie request for an encrypted cookie configured for inclusion in a request for a digital component for presentation on a webpage, wherein the digital component request identifier is different from digital component request identifiers for different digital component requests transmitted by the computing device;

receiving, from the component provider process, the encrypted cookie generated by encrypting the cookie using the digital component request identifier for the digital component request with which an encrypted cookie will be sent and an encryption key, wherein the encrypted cookie is configured for inclusion in a request for digital components from the digital component provider for presentation on the webpage;

generating, by the computing device, the digital component request that includes the encrypted cookie and requests identification of a digital component selected for presentation on the webpage using the encrypted cookie; and transmitting, to a digital component distribution system, the digital component request that includes the encrypted cookie and requests identification of a digital component selected for presentation on the webpage using the encrypted cookie;

receiving, from the digital component distribution system, the digital component; and presenting the digital component on the webpage.

2. The method of claim 1, comprising:

receiving, by a component provider process for a digital component provider and from a web browser, a cookie request that includes a digital component request identifier;

generating an encrypted cookie by encrypting a cookie for the digital component provider using the digital component request identifier and a public key for the digital component provider; and providing the encrypted cookie to the web browser.

3. The method of claim 2, comprising:

receiving, by the component provider process and from the web browser, the cookie for the digital component provider.

4. The method of claim 3, comprising:

sending, by the component provider process and to the web browser, a request for the cookie, wherein receiving the cookie is responsive to sending the request for the cookie.

5. The method of claim 2, comprising:

receiving, from a system for the digital component provider, a script for the component provider process; and creating the component provider process using the script.

6. The method of claim 5, wherein the script comprises a default script for a component provider process.

7. The method of claim 5, wherein creating the component provider process comprises executing the component provider process on the computing device.

8. The method of claim 1, comprising:

creating the component provider process for the digital component provider.

9. The method of claim 1, comprising creating the digital component request identifier that indicates a location on a webpage for which content will be requested, wherein transmitting the digital component request comprises transmitting, to a digital component distribution system, the digital component request that includes the encrypted cookie and requests identification of a digital component for presentation at the location on the webpage.

10. The method of claim 1, comprising generating, as the digital component request identifier, a nonce.

11. The method of claim 1, wherein generating and providing, to the component provider process, the encrypted cookie request comprises:

providing, to the component provider process, the cookie for the digital component provider before receiving the encrypted cookie.

12. The method of claim 1, comprising:

providing, to each of multiple different component provider processes each for a different digital component provider, a respective encrypted cookie request that requests encryption of a cookie of the respective digital component provider and includes the digital component request identifier;

receiving, from one or more of the multiple different component provider processes, an encrypted cookie generated by encrypting the cookie for the respective digital component provider using the digital component request identifier; and transmitting, to the digital component distribution system, the digital component request that includes the encrypted cookies for each of the one or more of the multiple different component provider processes and requests identification of a digital component for presentation on the webpage.

13. The method of claim 12, wherein:

providing, to each of the multiple different component provider processes, the respective encrypted cookie request comprises providing, to each of the multiple different component provider processes each for a different digital component provider, the respective encrypted cookie request using cross-document messaging or as a uniform resource identifier parameter; and receiving, from the two or more of the multiple different component provider processes, the encrypted cookie comprises receiving, from the two or more of the multiple different component provider processes and using cross-document messaging or as a uniform resource identifier parameter, the encrypted cookie generated by encrypting the cookie for the respective digital component provider using the digital component request identifier.

14. The method of claim 1, comprising:

providing, to the component provider process, two or more encrypted cookie requests that each request encryption of the cookie of the digital component provider and include a respective digital component request identifier different from digital component request identifiers for the other encrypted cookie requests;

receiving, from the component provider process and for each of the two or more encrypted cookie requests, a respective encrypted cookie generated by encrypting the cookie using the respective component request identifier, each of the respective encrypted cookies different from the other encrypted cookies based on the different digital component request identifiers; and transmitting, to the digital component distribution system and for each of the two or more encrypted cookie requests, a respective digital component request that includes the respective encrypted cookie and requests identification of a digital component for presentation on the webpage.

15. The method of claim 1, wherein transmitting the digital component request comprises:

providing, to the digital component distribution system, the digital component request that comprises a public key for the computing device, a creation time for the digital component request, a payload, an integrity token, a digital signature, and the encrypted cookie.

16. The method of claim 15, wherein the integrity token comprises a verdict that indicates whether the computing device, an application executing on the computing device for which the digital component request was provided, or both, have been validated.

17. The method of claim 15, wherein:
receiving the encrypted cookie comprises receiving, by a content tag for the webpage received by a web browser, the encrypted cookie; and
generating the digital component request comprises:
providing, by the content tag and to the web browser, a request that comprises the digital component request identifier and the encrypted cookie; and
generating, by the web browser, the digital component request that comprises the public key for the computing device, the creation time for the digital component request, the payload, the integrity token, the digital signature, and the encrypted cookie; and
transmitting the digital component request comprises:
transmitting, by the web browser and to the digital component distribution system, the digital component request that comprises the public key for the computing device, the creation time for the digital component request, the payload, the integrity token, the digital signature, and the encrypted cookie.

18. The method of claim 1, comprising:
determining, by the computing device, whether a web browser that presents a digital component for the webpage supports third-party cookies, wherein providing the encrypted cookie request to the component provider process is responsive to determining that the web browser does not support third-party cookies.

19. A system comprising one or more computers and one or more storage devices on which are stored instructions that are operable, when executed by the one or more computers, to cause the one or more computers to perform operations comprising:
providing, to a component provider process for a digital component provider, an encrypted cookie request that (i) requests encryption of a cookie of the digital component provider and (ii) includes a digital component request identifier for a digital component request with which an encrypted cookie will be sent, the encrypted cookie request for an encrypted cookie configured for inclusion in a request for a digital component for presentation on a webpage, wherein the digital component request identifier is different from digital component request identifiers for different digital component requests transmitted by the one or more computers;
receiving, from the component provider process, the encrypted cookie generated by encrypting the cookie using the digital component request identifier for the digital component request with which an encrypted cookie will be sent and an encryption key, wherein the encrypted cookie is configured for inclusion in a request for digital components from the digital component provider for presentation on the webpage;
generating the digital component request for digital components that includes the encrypted cookie and requests identification of a digital component selected for presentation on the webpage using the encrypted cookie; and
transmitting, to a digital component distribution system, the digital component request that includes the encrypted cookie and requests identification of a digital component selected for presentation on the webpage using the encrypted cookie;
receiving, from the digital component distribution system, the digital component; and
presenting the digital component on the webpage.

20. A non-transitory computer storage medium encoded with instructions that, when executed by one or more computers, cause the one or more computers to perform operations comprising:
providing, to a component provider process for a digital component provider, an encrypted cookie request that (i) requests encryption of a cookie of the digital component provider and (ii) includes a digital component request identifier for a digital component request with which an encrypted cookie will be sent, the encrypted cookie request for an encrypted cookie configured for inclusion in a request for a digital component for presentation on a webpage, wherein the digital component request identifier is different from digital component request identifiers for different digital component requests transmitted by the one or more computers;
receiving, from the component provider process, the encrypted cookie generated by encrypting the cookie using the digital component request identifier for the digital component request with which an encrypted cookie will be sent and an encryption key, wherein the encrypted cookie is configured for inclusion in a request for digital components from the digital component provider for presentation on the webpage;
generating the digital component request that includes the encrypted cookie and requests identification of a digital component selected for presentation on the webpage using the encrypted cookie; and
transmitting, to a digital component distribution system, the digital component request that includes the encrypted cookie and requests identification of a digital component selected for presentation on the webpage using the encrypted cookie;
receiving, from the digital component distribution system, the digital component; and
presenting the digital component on the webpage.

* * * * *